(12) United States Patent
Honda

(10) Patent No.: US 12,084,108 B2
(45) Date of Patent: Sep. 10, 2024

(54) LANE DEPARTURE SUPPRESSION DEVICE

(71) Applicant: TOYOTA JIDOSHA KABUSHIKI KAISHA, Toyota (JP)

(72) Inventor: Masaaki Honda, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 237 days.

(21) Appl. No.: 17/884,954

(22) Filed: Aug. 10, 2022

(65) Prior Publication Data

US 2023/0065417 A1 Mar. 2, 2023

(30) Foreign Application Priority Data

Sep. 1, 2021 (JP) .................................. 2021-142467

(51) Int. Cl.
*B62D 15/02* (2006.01)
*B60Q 9/00* (2006.01)

(52) U.S. Cl.
CPC ............. *B62D 15/025* (2013.01); *B60Q 9/00* (2013.01)

(58) Field of Classification Search
CPC ................................ B62D 15/025; B60Q 9/00
See application file for complete search history.

(56) References Cited

U.S. PATENT DOCUMENTS

| | | | | |
|---|---|---|---|---|
| 11,772,648 B2 * | 10/2023 | Srivatsan | ............ | B60W 10/18 701/25 |
| 2005/0096828 A1 | 5/2005 | Uemura et al. | | |
| 2017/0233001 A1 * | 8/2017 | Moshchuk | ............ | B62D 6/00 701/42 |
| 2018/0339693 A1 * | 11/2018 | Kunihiro | ............ | F02D 17/04 |
| 2019/0077454 A1 * | 3/2019 | Stroebel | ............ | B60W 50/14 |
| 2020/0010085 A1 * | 1/2020 | Ohmura | ............ | B60W 50/082 |
| 2020/0110420 A1 * | 4/2020 | Yamamoto | ............ | E01F 11/00 |
| 2020/0262424 A1 * | 8/2020 | Kong | ............ | B60K 35/00 |
| 2020/0339109 A1 * | 10/2020 | Hong | ............ | B60W 30/08 |

FOREIGN PATENT DOCUMENTS

| | | | |
|---|---|---|---|
| JP | 2005-132184 A | 5/2005 | |
| JP | 2005-242483 A | 9/2005 | |

* cited by examiner

*Primary Examiner* — George C Jin
(74) *Attorney, Agent, or Firm* — Sughrue Mion, PLLC

(57) ABSTRACT

A lane departure suppression device: executes automatic steering control when a lane departure condition is satisfied while an automatic steering permission condition is satisfied; executes warning control such that a level of a warning is a predetermined warning level when a departure avoidable condition is not satisfied, the departure avoidable condition being satisfied when the automatic steering permission condition is satisfied, in a case where the automatic steering control is not being executed when a warning execution condition is satisfied; and does not execute the warning control or executes the warning control such that the level of the warning is a level lower than the predetermined warning level when the departure avoidable condition is satisfied, in the case where the automatic steering control is not being executed when the warning execution condition is satisfied.

5 Claims, 9 Drawing Sheets

LANE DEPARTURE SUPPRESSION DEVICE

CROSS-REFERENCE TO RELATED APPLICATION

This application claims priority to Japanese Patent Application No. 2021-142467 filed on Sep. 1, 2021, incorporated herein by reference in its entirety.

BACKGROUND

1. Technical Field

The present disclosure relates to a lane departure suppression device.

2. Description of Related Art

There are known lane departure suppression devices that perform, as lane departure suppression control to suppress an own vehicle from departing from a lane, warning control that issues a warning to notify the driver of the own vehicle that the own vehicle is about to depart from the lane, or automatic steering control that automatically applies steering force to the own vehicle to return the own vehicle to the lane.

SUMMARY

As such lane departure suppression devices, there is known a lane departure suppression device that individually sets a determination value used to determine whether to start the warning control and a determination value used to determine whether to start the automatic steering control (see, for example, Japanese Unexamined Patent Application Publication No. 2005-242483 (JP 2005-242483 A)).

The warning control is control for prompting the driver to perform a driving operation (departure avoidance operation) to return the own vehicle that is about to depart from the lane to the lane, while the automatic steering control is control for automatically applying steering force to the own vehicle to return the own vehicle to the lane without prompting the driver to perform the departure avoidance operation. Since the purposes of these controls are different, there are certain benefits to individually setting the determination value used to determine whether to start the warning control and the determination value used to determine whether to start the automatic steering control.

However, when the determination values are set individually, for example, a warning may be issued, and while the driver who has noticed the warning voluntarily attempts to perform the departure avoidance operation, the automatic steering control may be started. In such a case, the own vehicle is eventually returned to the lane by the automatic steering control, so that the driver may feel that an unnecessary warning has been issued. In other words, the driver may find the warning annoying.

An object of the present disclosure is to provide a lane departure suppression device that can reduce causing the driver to feel annoyed by a warning for notifying the driver that the own vehicle may depart from the lane.

A lane departure suppression device according to the present disclosure includes a control device that executes warning control and automatic steering control, the warning control being control that issues a warning to notify a driver of an own vehicle that there is a possibility that the own vehicle departs from a lane, and the automatic steering control being control that performs automatic steering by automatically applying a steering force to the own vehicle having the possibility to depart from the lane and by returning the own vehicle to the lane.

In the lane departure suppression device according to the present disclosure, the control device is configured to execute the automatic steering control when a lane departure condition is satisfied while an automatic steering permission condition is satisfied. Further, the control device is configured to execute the warning control such that a level of the warning is a predetermined warning level when a departure avoidable condition is not satisfied, the departure avoidable condition being satisfied when the automatic steering permission condition is satisfied, in a case where the automatic steering control is not being executed when a warning execution condition is satisfied. On the other hand, the control device is configured to not execute the warning control or execute the warning control such that the level of the warning is a level lower than the predetermined warning level when the departure avoidable condition is satisfied, in the case where the automatic steering control is not being executed when the warning execution condition is satisfied.

When the automatic steering permission condition is satisfied but the automatic steering control is not being executed, if the lane departure condition is satisfied later, the automatic steering control is started, and the departure of the own vehicle from the lane is avoided by the automatic steering control. That is, when the automatic steering permission condition is satisfied but the automatic steering control is not being executed, the departure of the own vehicle from the lane (the lane departure of the own vehicle) is likely to be avoided by the automatic steering control that will be started later. In such a case, if the warning control is started because the warning execution condition is satisfied, the warning is issued even though the lane departure of the own vehicle will eventually be avoided by the automatic steering control, which may cause the driver to feel annoyed by the warning.

According to the present disclosure, the departure avoidable condition is set to be satisfied on condition that the automatic steering permission condition is satisfied. Therefore, in the case where the automatic steering control is not being executed at the time when the warning execution condition is satisfied, but the automatic steering control is started later and the lane departure of the own vehicle may be avoided by the automatic steering control, the warning control is not executed or the warning control with a lowered level of the warning is executed. This can reduce the possibility that the driver feels annoyed by the warning.

In the lane departure suppression device according to the present disclosure, the departure avoidable condition may include a condition that the driver of the own vehicle is in a state able to perform a driving operation on the own vehicle.

If the driver is in a state capable of performing a driving operation on the own vehicle, it can be expected that the departure avoidance operation (driving operation for avoiding the departure of the own vehicle from the lane) will be voluntarily performed by the driver without the need to issue the warning when the own vehicle is about to depart from the lane. However, if the warning is not issued when the driver is not in a state capable of performing a driving operation on the own vehicle, it cannot be expected that the departure avoidance operation will be voluntarily performed by the driver, so that in this case, it is preferable to issue the warning in order to increase the possibility of avoiding the lane departure of the own vehicle.

According to the present disclosure, since the departure avoidable condition includes a condition that the driver is in a state capable of performing a driving operation, the measures of avoiding the execution of the warning control even when the warning execution condition is satisfied or executing the warning control with a lowered level of the warning when the warning execution condition is satisfied are taken only in the case where the driver is in a state capable of performing a driving operation at the time when the own vehicle is about to depart from the lane. Since it can be highly expected that the driver will voluntarily perform the departure avoidance operation even when the warning control is not executed or the warning control is executed with a lowered level of the warning, it is possible to secure the possibility of avoiding the lane departure of the own vehicle.

In the lane departure suppression device according to the present disclosure, the departure avoidable condition may include a condition that a definition object that defines the lane is not a three-dimensional structure.

If the own vehicle departs from the lane in a situation where the definition object that defines the lane is a three-dimensional structure, the own vehicle may come into contact with the three-dimensional structure. Accordingly, in such a situation, even if it is likely that contact of the own vehicle with the three-dimensional structure can be avoided by avoiding the lane departure of the own vehicle by the automatic steering control, it is preferable to issue the warning to prompt the driver to perform the departure avoidance operation, in order to ensure the traveling safety of the own vehicle. In other words, when taking measures of avoiding the execution of the warning control even when the warning execution condition is satisfied or executing the warning control with a lowered level of the warning when the warning execution condition is satisfied, it is preferable that the measures are taken only in the case where there is no possibility of the own vehicle coming into contact with the three-dimensional structure.

According to the present disclosure, since the departure avoidable condition includes a condition that the definition object that defines the lane (lane definition object) is not the three-dimensional structure, the measures of avoiding the execution of the warning control even when the warning execution condition is satisfied or executing the warning control with a lowered level of the warning when the warning execution condition is satisfied are taken only in the case where the lane definition object is not the three-dimensional structure at the time when the own vehicle is about to depart from the lane. Thus, it is possible to ensure the traveling safety of the own vehicle even when the warning control is not executed or the warning control is executed with a lowered level of the warning.

In the lane departure suppression device according to the present disclosure, the departure avoidable condition may include a condition that there is no object outside a definition object that defines the lane, the object being an object having a possibility to be contacted by the own vehicle.

When there is an object outside the lane definition object, the object being an object the own vehicle may collide with when the own vehicle departs from the lane, it is preferable to issue the warning to prompt the driver to perform the departure avoidance operation, in order to ensure the traveling safety of the own vehicle. In other words, when taking measures of avoiding the execution of the warning control even when the warning execution condition is satisfied or executing the warning control with a lowered level of the warning when the warning execution condition is satisfied, it is preferable that the measures are taken only in the case where there is no object the own vehicle may collide with outside the lane definition object.

According to the present disclosure, since the departure avoidable condition includes a condition that there is no object, with which the own vehicle may come into contact, outside the lane definition object, the measures of avoiding the execution of the warning control even when the warning execution condition is satisfied or executing the warning control with a lowered level of the warning when the warning execution condition is satisfied are taken only in the case where there is no object, with which the own vehicle may come into contact, outside the lane definition object at the time when the own vehicle is about to depart from the lane. Thus, it is possible to ensure the traveling safety of the own vehicle even when the warning control is not executed or the warning control is executed with a lowered level of the warning.

In the lane departure suppression device according to the present disclosure, the control device may be configured to delay a timing of starting the warning control in executing the warning control when the warning execution condition is satisfied while the departure avoidable condition is satisfied, as compared with when the warning execution condition is satisfied while the departure avoidable condition is not satisfied.

When the start of the warning control is delayed, the level of the warning issued by the warning control is considered to be lowered. That is, when the start of the warning control is delayed, the execution period of the warning control is shortened by the delayed period, so that the level of the warning issued by the warning control is considered to be lowered.

According to the present disclosure, the timing of starting the warning control is delayed when the warning execution condition is satisfied while the departure avoidable condition is satisfied, as compared with when the warning execution condition is satisfied while the departure avoidable condition is not satisfied. Accordingly, when it is likely that the own vehicle will be returned to the lane by the automatic steering control, the warning control with the lowered level of the warning is executed. This can reduce the possibility that the driver feels annoyed by the warning issued by the warning control.

The components of the present disclosure are not limited to the embodiment of the present disclosure described later with reference to the drawings. Other objects, other features, and accompanying advantages of the present disclosure will be readily understood from the description of the embodiment of the present disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
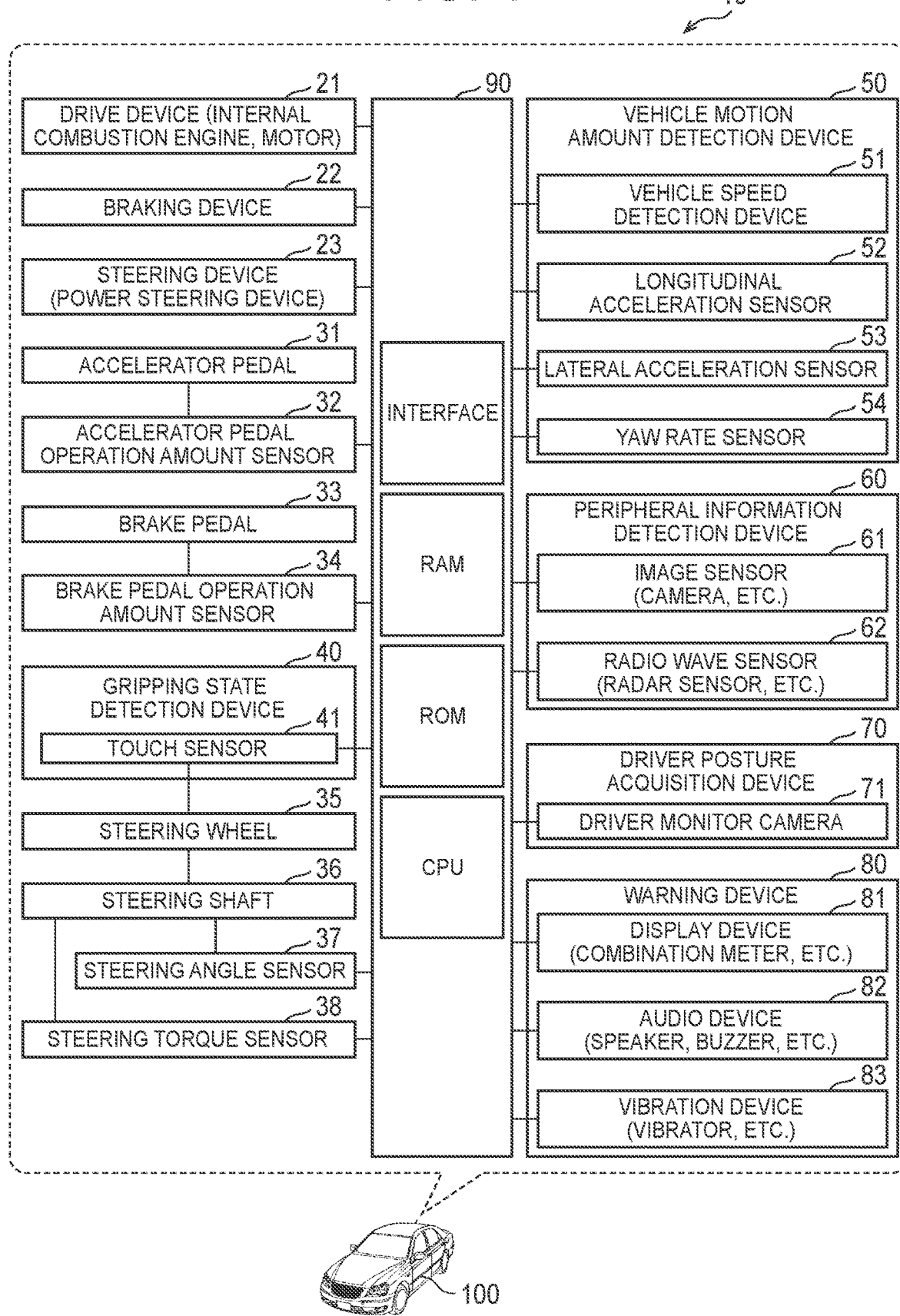
FIG. 1 is a diagram showing a lane departure suppression device according to an embodiment of the present disclosure and a vehicle (an own vehicle) on which the device is mounted.

Hereinafter, a lane departure suppression device according to an embodiment of the present disclosure will be described with reference to the drawings. As shown in FIG. 1, a lane departure suppression device 10 according to the embodiment of the present disclosure is mounted on an own vehicle 100.

ECU

The lane departure suppression device 10 includes an ECU 90 as a control device. The term ECU is an abbreviation for electronic control unit. The ECU 90 includes a microcomputer as a main part. The microcomputer includes a central processing unit (CPU), a read-only memory (ROM), a random access memory (RAM), a non-volatile memory, an interface, and the like. The CPU realizes various functions by executing instructions, programs, or routines stored in the ROM.

Drive Device, Etc.

The own vehicle 100 is equipped with a drive device 21, a braking device 22, and a steering device 23.

Drive Device

The drive device 21 is a device that outputs a driving torque (driving force) applied to the own vehicle 100 in order to cause the own vehicle 100 to travel, and is, for example, an internal combustion engine, a motor, or the like. The drive device 21 is electrically connected to the ECU 90. The ECU 90 can control the driving torque output from the drive device 21 by controlling the operation of the drive device 21.

Braking Device

The braking device 22 is a device that outputs a braking torque (braking force) applied to the own vehicle 100 in order to brake the own vehicle 100. The braking device 22 is electrically connected to the ECU 90. The ECU 90 can control the braking torque output from the braking device 22 by controlling the operation of the braking device 22.

Steering Device

The steering device 23 is a device that outputs a steering torque (steering force) applied to the own vehicle 100 in order to steer the own vehicle 100, and is, for example, a power steering device. The steering device 23 is electrically connected to the ECU 90. The ECU 90 can control the steering torque output from the steering device 23 by controlling the operation of the steering device 23.

Sensors, Etc.

An accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a gripping state detection device 40, a vehicle motion amount detection device 50, a peripheral information detection device 60, a driver posture acquisition device 70, and a warning device 80 are also mounted on the own vehicle 100.

Accelerator Pedal Operation Amount Sensor

The accelerator pedal operation amount sensor 32 is a sensor that detects the operation amount of the accelerator pedal 31. The accelerator pedal operation amount sensor 32 is electrically connected to the ECU 90. The accelerator pedal operation amount sensor 32 transmits the detected operation amount information of the accelerator pedal 31 to the ECU 90. The ECU 90 acquires the operation amount of the accelerator pedal 31 as the accelerator pedal operation amount AP based on the information.

The ECU 90 acquires a required driving torque (required driving force) by calculation based on the accelerator pedal operation amount AP and the traveling speed (vehicle speed SPD) of the own vehicle 100. The required driving torque is the driving torque required to be output from the drive device 21. The ECU 90 controls the operation of the drive device 21 so that the required driving torque is output.

Brake Pedal Operation Amount Sensor

The brake pedal operation amount sensor 34 is a sensor that detects the operation amount of the brake pedal 33. The brake pedal operation amount sensor 34 is electrically connected to the ECU 90. The brake pedal operation amount sensor 34 transmits the detected operation amount information of the brake pedal 33 to the ECU 90. The ECU 90 acquires the operation amount of the brake pedal 33 as the brake pedal operation amount BP based on the information.

The ECU 90 acquires the required braking torque (required braking force) by calculation based on the brake pedal operation amount BP. The required braking torque is the braking torque required to be output from the braking device 22. The ECU 90 controls the operation of the braking device 22 so that the required braking torque is output.

Steering Angle Sensor

The steering angle sensor 37 is a sensor that detects the rotation angle of the steering shaft 36 with respect to the neutral position. The steering angle sensor 37 is electrically connected to the ECU 90. The steering angle sensor 37 transmits the detected rotation angle information of the steering shaft 36 to the ECU 90. The ECU 90 acquires the rotation angle of the steering shaft 36 as the steering angle θ based on the information.

Steering Torque Sensor

The steering torque sensor 38 is a sensor that detects the torque input to the steering shaft 36 by a driver DR of the own vehicle 100 via the steering wheel 35. The steering torque sensor 38 is electrically connected to the ECU 90. The steering torque sensor 38 transmits the detected torque information to the ECU 90. The ECU 90 acquires the torque (driver input torque) input to the steering shaft 36 by the driver DR via the steering wheel 35 based on the information.

Gripping State Detection Device

The gripping state detection device 40 is a device that detects the gripping state of the steering wheel 35 by the driver DR, and in this example, is a touch sensor 41 installed on the steering wheel 35.

Touch Sensor

The touch sensor 41 is a sensor that detects that the driver DR has touched the steering wheel 35. The touch sensor 41 is electrically connected to the ECU 90. When the touch sensor 41 detects that the driver DR has touched the steering wheel 35, the touch sensor 41 transmits information (a signal) relating to the portion of the steering wheel 35 touched by the driver DR to the ECU 90. The ECU 90 recognizes the portion of the steering wheel 35 touched by the driver DR based on the information (signal), and the ECU 90 can thus determine whether the driver DR is in a state capable of performing a driving operation on the own vehicle 100 based on the recognized portion of the steering wheel 35. The state in which the driver DR can perform a driving operation on the own vehicle 100 is, for example, a state in which the driver DR grips the portion of the steering wheel 35 appropriate for the driving operation with both hands.

Vehicle Motion Amount Detection Device

The vehicle motion amount detection device 50 is a device that detects the motion amount of the own vehicle 100, and in this example, includes a vehicle speed detection device 51, a longitudinal acceleration sensor 52, a lateral acceleration sensor 53, and a yaw rate sensor 54.

Vehicle Speed Detection Device

The vehicle speed detection device 51 is a device that detects the traveling speed (vehicle speed) of the own vehicle 100, and is, for example, a wheel speed sensor. The vehicle speed detection device 51 is electrically connected to the ECU 90. The vehicle speed detection device 51 transmits the detected vehicle speed information of the own vehicle 100 to the ECU 90. The ECU 90 acquires the vehicle speed SPD of the own vehicle 100 based on the information.

The ECU 90 acquires the required steering torque by calculation based on the acquired steering angle θ, the driver input torque, and the vehicle speed SPD. The required steering torque is the steering torque required to be output from the steering device 23. The ECU 90 controls the operation of the steering device 23 so that the required steering torque is output from the steering device 23, except when the automatic steering control described later is executed.

Longitudinal Acceleration Sensor

The longitudinal acceleration sensor 52 is a sensor that detects the acceleration of the own vehicle 100 in the front-rear direction. The longitudinal acceleration sensor 52 is electrically connected to the ECU 90. The longitudinal acceleration sensor 52 transmits the detected acceleration information to the ECU 90. The ECU 90 acquires the acceleration in the front-rear direction of the own vehicle 100 as the longitudinal acceleration GX based on the information.

Lateral Acceleration Sensor

The lateral acceleration sensor 53 is a sensor that detects the acceleration of the own vehicle 100 in the lateral direction (width direction). The lateral acceleration sensor 53 is electrically connected to the ECU 90. The lateral acceleration sensor 53 transmits the detected acceleration information to the ECU 90. The ECU 90 acquires the acceleration in the lateral direction of the own vehicle 100 as the lateral acceleration GY based on the information.

Yaw Rate Sensor

The yaw rate sensor 54 is a sensor that detects the yaw rate YR of the own vehicle 100. The yaw rate sensor 54 is electrically connected to the ECU 90. The yaw rate sensor 54 transmits the detected information of the yaw rate YR to the ECU 90. The ECU 90 acquires the yaw rate YR of the own vehicle 100 based on the information. For example, the yaw rate YR is used for determining the steering force to be applied to the own vehicle 100 when the own vehicle 100 is automatically turned by automatically applying the steering force to the own vehicle 100 by the automatic steering control described later.

Peripheral Information Detection Device

The peripheral information detection device 60 is a device that detects information of the periphery of the own vehicle 100, and in this example, includes an image sensor 61 and a radio wave sensor 62. The image sensor 61 is, for example, a camera. The radio wave sensor 62 is, for example, a radar sensor (millimeter wave radar or the like). The peripheral information detection device 60 may include a sound wave sensor such as an ultrasonic sensor (clearance sonar) or an optical sensor such as a laser radar (LiDAR).

Image Sensor

The image sensor 61 is electrically connected to the ECU 90. The image sensor 61 captures an image of the periphery of the own vehicle 100 and transmits information related to the captured image to the ECU 90. The ECU 90 can acquire information (peripheral detection information INF_D) about the periphery of the own vehicle 100 based on the information (image information).

Radio Wave Sensor

The radio wave sensor 62 is electrically connected to the ECU 90. The radio wave sensor 62 transmits radio waves and receives radio waves (reflected waves) reflected by an object. The radio wave sensor 62 transmits information (detection result) related to the transmitted radio waves and the received radio waves (reflected waves) to the ECU 90. In other words, the radio wave sensor 62 detects an object existing in the periphery of the own vehicle 100, and transmits information (detection result) related to the detected object to the ECU 90. The ECU 90 can acquire information (peripheral detection information INF_D) related to the object existing in the periphery of the own vehicle 100 based on the information (radio wave information).

Driver Posture Acquisition Device

The driver posture acquisition device 70 is a device that detects the consciousness state of the driver DR, and in this example, it is a driver monitor camera 71. The driver monitor camera 71 is provided in the vehicle cabin of the own vehicle 100 toward the driver DR so that the face of the driver DR can be imaged.

Driver Monitor Camera

The driver monitor camera 71 is a camera that captures an image of the face of the driver DR. The driver monitor camera 71 is electrically connected to the ECU 90. The driver monitor camera 71 transmits information (image data) related to the captured image of the face of the driver DR to the ECU 90. The ECU 90 can determine whether the driver DR is in a state capable of performing a driving operation on the own vehicle 100 based on the information. The state in which the driver DR can perform a driving operation on the own vehicle 100 is, for example, a state in which the driver DR faces the steering wheel 35 and the eyes of the driver DR are open (that is, the driver DR is awake).

Warning Device

The warning device 80 is a device for notifying the driver DR that the own vehicle 100 may depart from the lane LN, and in this example, includes a display device 81, an audio device 82, and a vibration device 83.

Display Device

The display device 81 is a device for displaying an image, and is, for example, a human machine interface (HMI) such as a combination meter or a head-up display (HUD). The display device 81 is electrically connected to the ECU 90. The ECU 90 can display various images on the display device 81.

Audio Device

The audio device 82 is a device that outputs a voice such as an announcement or an electronic sound such as a buzzer sound, and is, for example, a speaker or a buzzer. The audio device 82 is electrically connected to the ECU 90. The ECU 90 can output various voices or various electronic sounds from the audio device 82.

Vibration Device

The vibration device 83 is a device that gives vibration to the driver DR, and is, for example, a vibrator built in the steering wheel 35 or the driver's seat. The vibration device 83 is electrically connected to the ECU 90. The ECU 90 can give vibration to the driver DR by operating the vibration device 83.

Outline of Operation of Lane Departure Suppression Device

Figure 2:
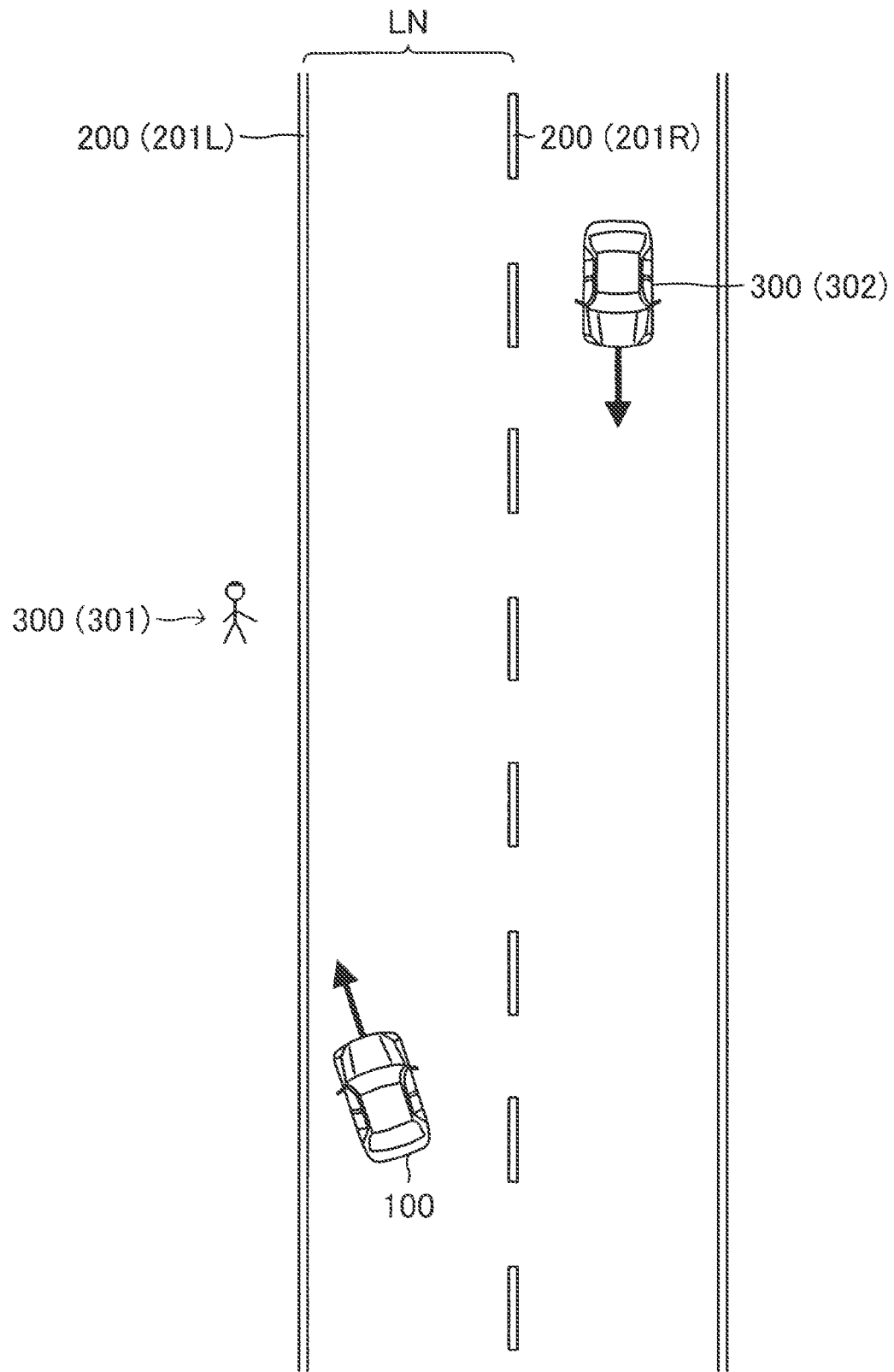
FIG. 2 is a diagram showing a scene in which the own vehicle is traveling in a direction departing from a lane.

Next, the outline of the operation of the lane departure suppression device 10 will be described. For example, as shown in FIG. 2, if the driver DR does not perform an appropriate driving operation after the own vehicle 100 starts to travel toward the definition line 201 on the left side (left definition line 201L), the own vehicle 100 will depart from the lane LN.

Therefore, when the lane departure suppression device 10 determines that the own vehicle 100 may depart from the lane LN, the lane departure suppression device 10 executes lane departure suppression control for suppressing the own vehicle 100 from departing from the lane LN. In this example, the lane departure suppression control includes automatic steering control and warning control.

The automatic steering control is control that automatically applies a steering force to the own vehicle 100 that is about to depart from the lane LN to return the own vehicle 100 to the lane LN. The warning control is control that issues a warning to notify the driver DR that the own vehicle 100 may depart from the lane LN. Hereinafter, the automatic steering control and the warning control will be described.

In this example, the warning issued by the warning control is performed by at least one of display on the display device 81 of an image and/or lighting on the display device 81 of the lamp indicating that the own vehicle 100 may depart from the lane LN, output of voice from the audio device 82 and/or output of a buzzer sound from the audio device 82 indicating that the own vehicle 100 may depart from the lane LN, and vibration of the steering wheel 35 and/or the driver's seat by the vibration device 83.

Automatic Steering Control

The lane departure suppression device 10 executes the automatic steering control when the automatic steering execution condition C_LDP is satisfied. In this example, the automatic steering execution condition C_LDP is satisfied when the automatic steering permission condition C_AS is satisfied and the lane departure condition (first departure condition C_D1) is satisfied.

The automatic steering permission condition C_AS is a condition for determining whether the requirement necessary for executing the automatic steering control in an appropriate manner is satisfied. In this example, the automatic steering permission condition C_AS is satisfied when the lane departure suppression device 10 can detect a lane definition object 200, the current vehicle speed SPD_N (current vehicle speed SPD of the own vehicle 100) is a vehicle speed within the predetermined vehicle speed range R_TH, and the driver DR is not performing an override operation.

The lane definition object 200 defines the lane LN, and in this example, is the definition line 201 on the left side of the lane LN (left definition line 201L), a definition line 201 on the right side of the lane LN (right definition line 201R), a road end such as grass and soil on the left side of the lane LN (left road end), a road end such as grass and soil on the right side of the lane LN (right road end), a guardrail on the left side of the lane LN (left guardrail), and a guardrail on the right side of the lane LN (right guardrail).

The lane departure suppression device 10 can detect the left definition line 201L, the right definition line 201R, the left road end, the right road end, the left guardrail, and the right guardrail based on the peripheral detection information INF_D.

Further, the override operation is, for example, an operation on the steering wheel 35 for avoiding the departure of the own vehicle 100 from the lane LN (the lane departure of the own vehicle 100).

Figure 3:
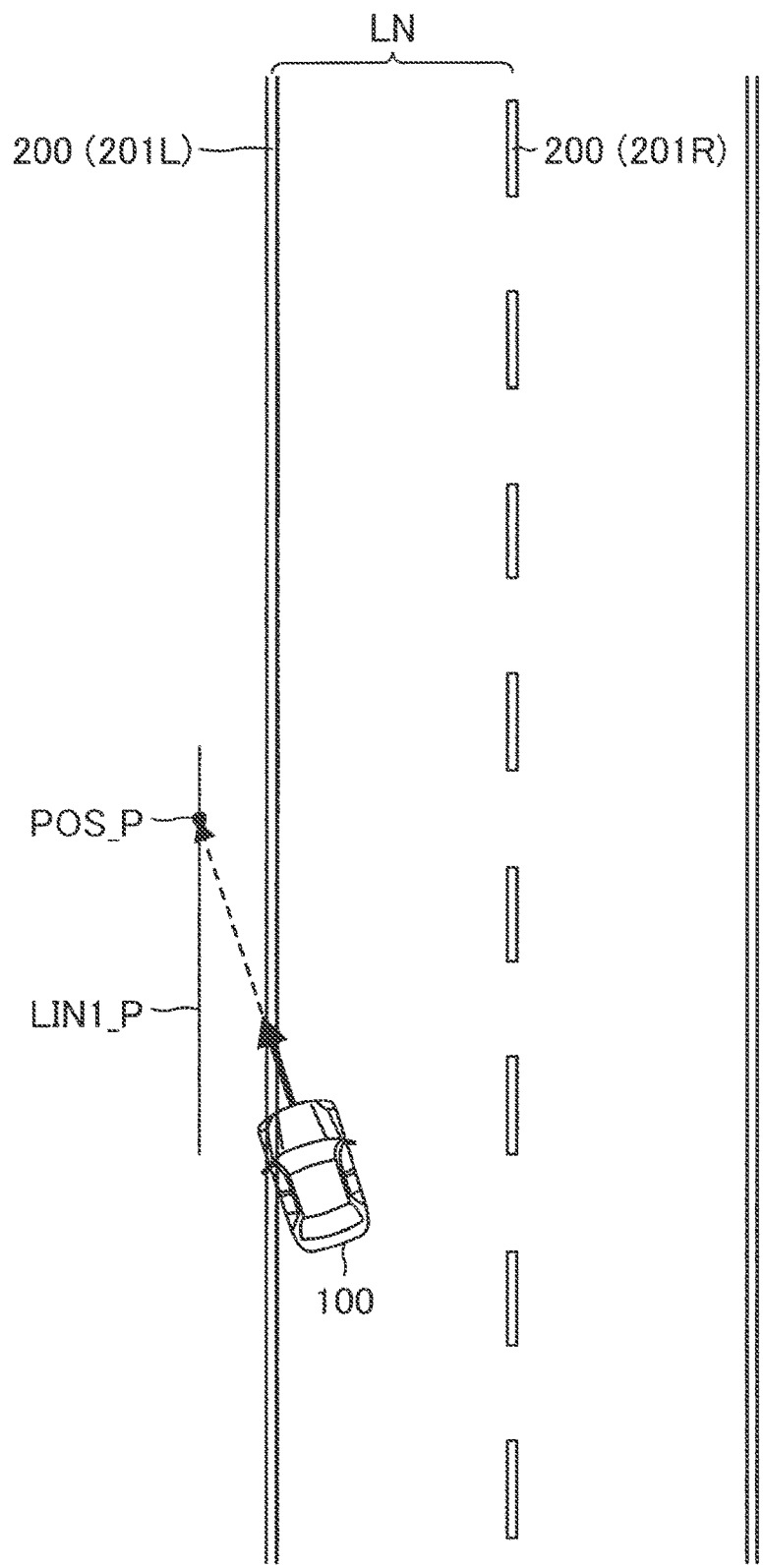
FIG. 3 is a diagram showing a scene in which a predicted vehicle position reaches a first predicted position determination line.

The first departure condition C_D1 is satisfied when the position of the own vehicle 100 after a predetermined time T (predicted vehicle position POS_P) reaches the first predicted position determination line LIN1_P, as shown in FIG. 3. In this example, the predetermined time T is a time predetermined as an appropriate time for determining the start timing of the lane departure suppression control.

The first predicted position determination line LIN1_P is a line extending along the lane definition object 200 (the left definition line 201L in the example shown in FIG. 3). The lane departure suppression device 10 sets the first predicted position determination line LIN1_P so that in the case where the automatic steering control is started when the predicted vehicle position POS_P reaches the first predicted position determination line LIN1_P, the automatic steering control can avoid the lane departure of the own vehicle 100 while ensuring the traveling safety of the own vehicle 100.

When setting the first predicted position determination line LIN1_P, the lane departure suppression device 10 takes into consideration factors such as the distance (definition object distance DIS_200) between the lane definition object 200 and the current position of the own vehicle 100 (current vehicle position POS_N), the current vehicle speed SPD_N (current vehicle speed SPD_N), the steering performance of the steering device 23, the allowable lateral acceleration of the own vehicle 100, and the type of the lane definition object 200 (whether the lane definition object 200 is a flat object such as the definition line 201 or the road end, or whether the lane definition object 200 is a three-dimensional structure such as the guardrail).

Further, the lane departure suppression device 10 acquires the predicted vehicle position POS_P based on the current vehicle position POS_N (current position of the own vehicle 100), the current vehicle speed SPD_N (current vehicle speed SPD), the current lateral acceleration GY_N (current lateral acceleration GY of the own vehicle 100), and the predetermined time T. Specifically, the lane departure suppression device 10 acquires the predicted vehicle position POS_P by calculation in accordance with the following equation 1 based on the current vehicle position POS_N, the current vehicle speed SPD_N, the current lateral acceleration GY_N, and the predetermined time T.

$$POS\_P = POS\_N + SPD\_N \times T + 1/2 \times GY\_N \times T2 \qquad (1)$$

In this example, the lane departure suppression device 10 acquires the current vehicle position POS_N with reference to the position of the lane definition object 200 based on the peripheral detection information INF_D.

Figure 4:
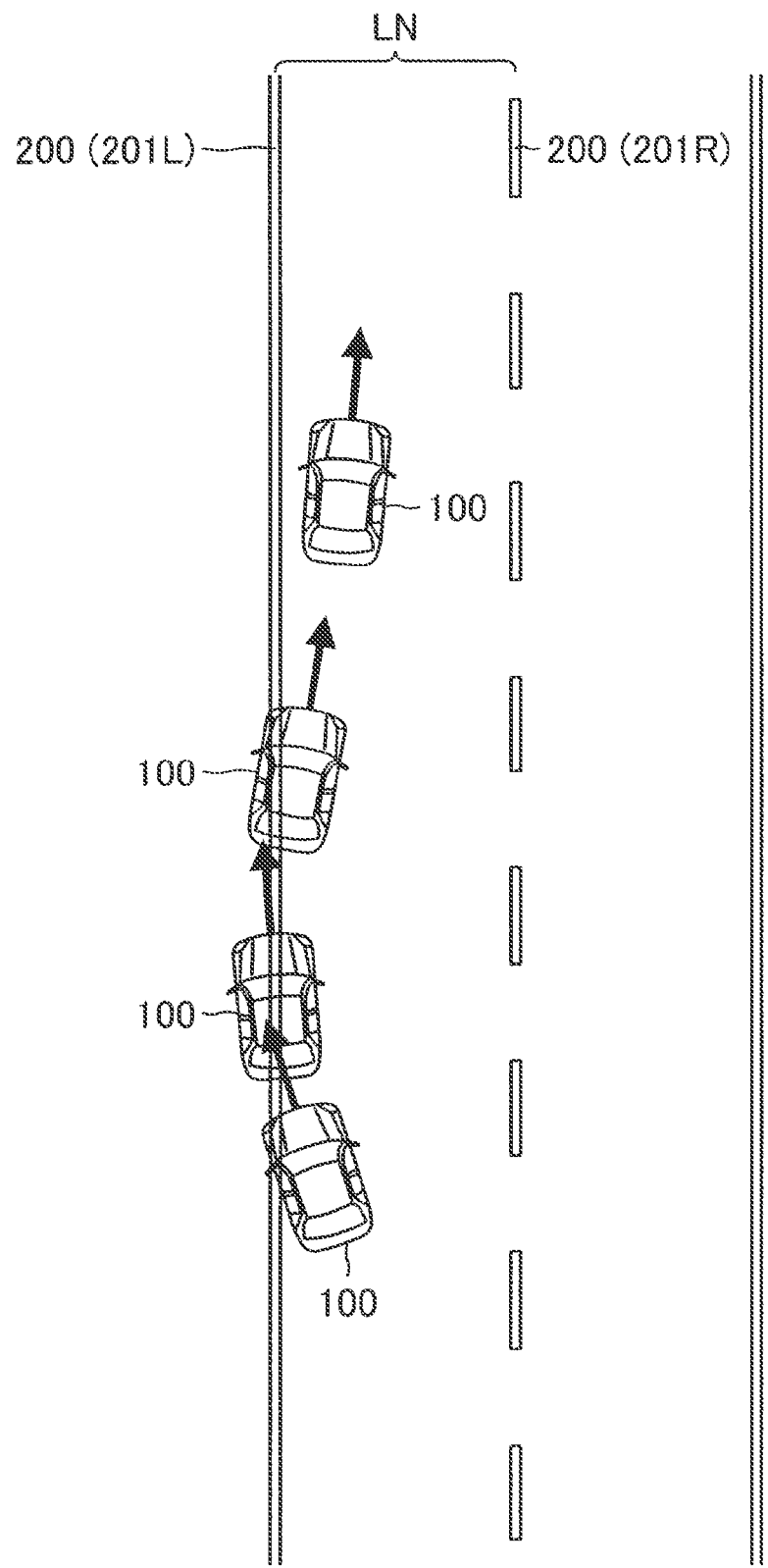
FIG. 4 is a diagram showing a scene in which a steering force is applied to the own vehicle by automatic steering control and the own vehicle returns to the lane.

When the automatic steering control is started, the lane departure suppression device 10 controls the operation of the steering device 23 and applies a steering force to the own vehicle 100 so that the own vehicle 100 returns to the lane LN. Accordingly, as shown in FIG. 4, the own vehicle 100 is returned to the lane LN.

As described above, the lane departure suppression device 10 determines whether the first departure condition C_D1 is satisfied based on whether the predicted vehicle position POS_P has reached the first predicted position determination line LIN1_P. However, a determination line (first current position determination line LIN1_N) different from the first predicted position determination line LIN1_P may be set, and the lane departure suppression device 10 may be configured to determine whether the first departure condition C_D1 is satisfied based on whether the current vehicle position POS_N has reached the first current position determination line LIN1_N.

In this case, the lane departure suppression device 10 sets, for example, the first predicted position determination line LIN1_P as described above, and in parallel with this, acquires the distance at which the own vehicle 100 moves in the lateral direction (predicted lateral movement distance DIS_P) from the present time until the predetermined time T elapses, and sets the line acquired by moving the first predicted position determination line LIN1_P closer to the lane LN by the predicted lateral movement distance DIS_P as the first current position determination line LIN1_N.

The lane departure suppression device 10 acquires the predicted lateral movement distance DIS_P by calculation in accordance with the following equation 2 based on the current vehicle speed SPD_N, the current lateral acceleration GY_N, and the predetermined time T.

$$DIS\_P = SPD\_N \times T + 1/2 \times GY\_N \times T2 \qquad (2)$$

Warning Control

The lane departure suppression device 10 executes the warning control when the departure avoidable condition C_DP is not satisfied, in the case where the warning execution condition C_LDA is satisfied while the automatic steering control is not being executed.

On the other hand, the lane departure suppression device 10 does not execute the warning control when the departure avoidable condition C_DP is satisfied in the case where the automatic steering control is not being executed at the time when the warning execution condition C_LDA is satisfied.

Further, the lane departure suppression device 10 does not execute the warning control in the case where the automatic steering control is being executed at the time when the warning execution condition C_LDA is satisfied.

Figure 5:
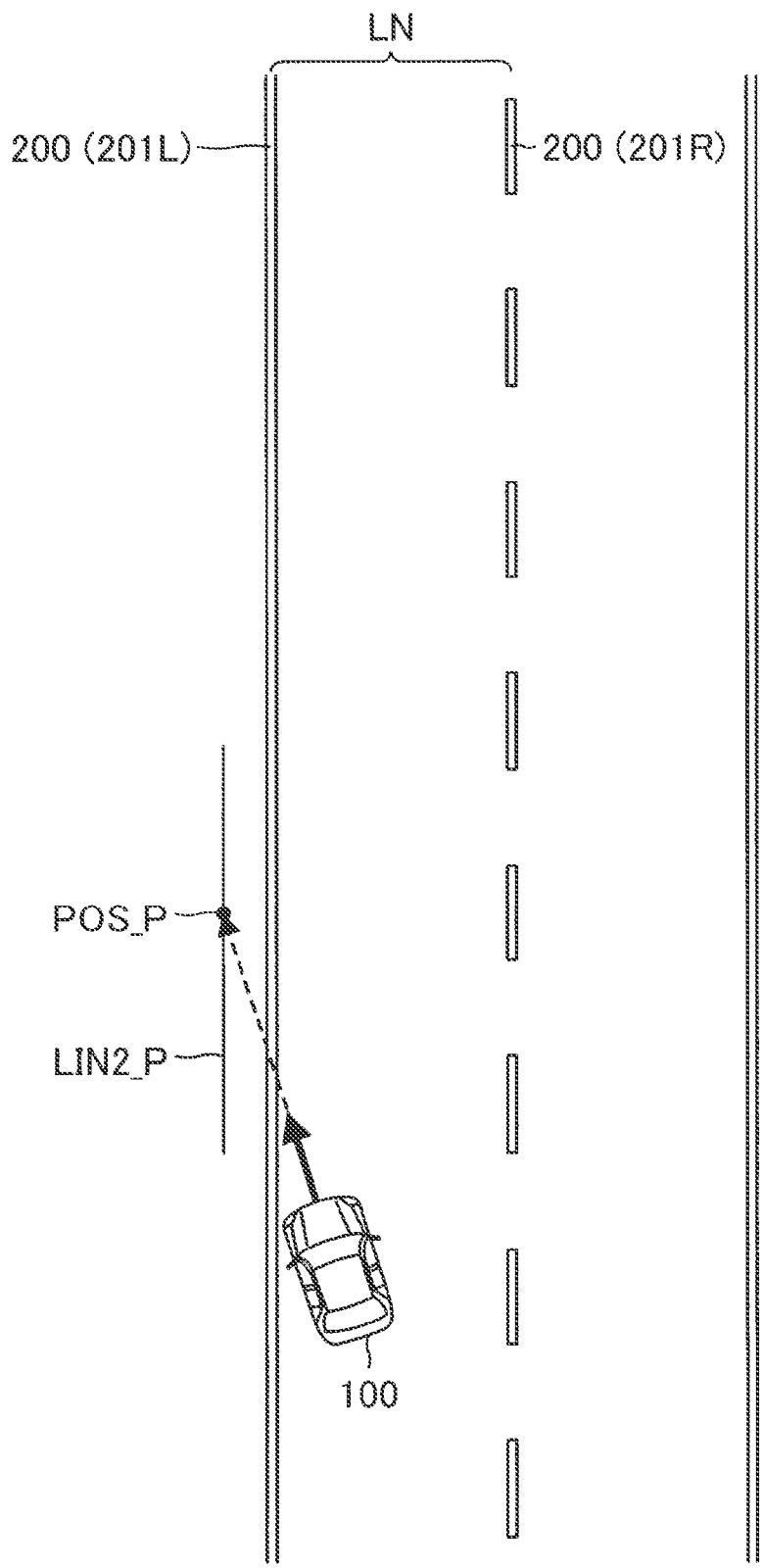
FIG. 5 is a diagram showing a scene in which the predicted vehicle position reaches a second predicted position determination line.

Here, the warning execution condition C_LDA is satisfied when the lane departure condition (second departure condition C_D2) is satisfied. The second departure condition C_D2 is satisfied when the predicted vehicle position POS_P has reached the second predicted position determination line LIN2_P, as shown in FIG. 5.

The second predicted position determination line LIN2_P is a line extending along the lane definition object 200 (the left definition line 201L in the example shown in FIG. 5), and is a line that allows the driver DR to notice the warning issued by the warning control and thus allows the driver DR to sufficiently avoid the lane departure of the own vehicle 100 by operation of the steering wheel 35, in the case where the warning control is started when the predicted vehicle position POS_P has reached the second predicted position determination line LIN2_P.

Therefore, the lane departure suppression device 10 sets the second predicted position determination line LIN2_P so that in the case where the warning control is started when the predicted vehicle position POS_P has reached the second predicted position determination line LIN2_P, the lane departure of the own vehicle 100 can be avoided by the departure avoidance operation of the driver DR (driving operation for avoiding the departure of the own vehicle 100 from the lane LN) while ensuring the traveling safety of the own vehicle 100.

When setting the second predicted position determination line LIN2_P, the lane departure suppression device 10 takes into consideration factors such as the definition object distance DIS_200 (distance between the lane definition object 200 and the current vehicle position POS_N), the current vehicle speed SPD_N, the driving operation ability of the driver DR (especially the steering wheel operation ability of the driver DR), and the type of the lane definition object 200 (whether the lane definition object 200 is a flat object such as the definition line 201 or a road end, or whether the lane definition object 200 is a three-dimensional structure such as a guardrail).

As described above, the lane departure suppression device 10 acquires the predicted vehicle position POS_P based on the current vehicle position POS_N, the current vehicle speed SPD_N, the current lateral acceleration GY_N, and the predetermined time T. Specifically, the lane departure suppression device 10 acquires the predicted vehicle position POS_P by calculation in accordance with the above equation 1 based on the current vehicle position POS_N, the current vehicle speed SPD_N, the current lateral acceleration GY_N, and the predetermined time T.

In this example, the departure avoidable condition C_DP is satisfied when the automatic steering permission condition C_AS is satisfied.

As described above, the lane departure suppression device 10 determines whether the second departure condition C_D2 is satisfied based on whether the predicted vehicle position POS_P has reached the second predicted position determination line LIN2_P. However, a determination line (second current position determination line LIN2_N) different from the second predicted position determination line LIN2_P may be set, and the lane departure suppression device 10 may be configured to determine whether the second departure condition C_D2 is satisfied based on whether the current vehicle position POS_N has reached the second current position determination line LIN2_N.

In this case, the lane departure suppression device 10 sets, for example, the second predicted position determination line LIN2_P as described above, and in parallel with this, acquires the predicted lateral movement distance DIS_P, and sets the line acquired by moving the second predicted position determination line LIN2_P closer to the lane LN by the predicted lateral movement distance DIS_P as the second current position determination line LIN2_N.

As described above, the lane departure suppression device 10 can acquire the predicted lateral movement distance DIS_P by calculation in accordance with the above equation 2 based on the current vehicle speed SPD_N, the current lateral acceleration GY_N, and the predetermined time T.

Effect

The lane departure suppression device 10 sets the first predicted position determination line LIN1_P and the second predicted position determination line LIN2_P in consideration of different factors. Thus, the predicted vehicle position POS_P may reach the first predicted position determination line LIN1_P first, or may reach the second predicted position determination line LIN2_P first. Accordingly, when the predicted vehicle position POS_P reaches the second predicted position determination line LIN2_P first, the predicted vehicle position POS_P has not reached the first predicted position determination line LIN1_P, so that at the time when the predicted vehicle position POS_P reaches the second predicted position determination line LIN2_P, the first departure condition C_D1 is not satisfied, and therefore the automatic steering control is not being executed.

However, at this time, in the case where the departure avoidable condition C_DP is satisfied, the automatic steering control is executed when the first departure condition C_D1 is satisfied, so that the lane departure of the own vehicle 100 is avoided by the automatic steering control. Therefore, even when the driver DR is not prompted to perform a driving operation (departure avoidance operation) for avoiding the lane departure of the own vehicle 100 by execution of the warning control, the first departure condition C_D1 is eventually satisfied to start the automatic steering control, so that the lane departure of the own vehicle 100 is avoided. If the warning control is executed in such a case, the driver DR may feel annoyed by the warning issued by the warning control.

The lane departure suppression device 10 does not execute the warning control when the warning execution condition C_LDA is satisfied while the departure avoidable condition C_DP is satisfied. That is, the lane departure suppression device 10 does not execute the warning control when the departure avoidable condition C_DP is satisfied, and therefore the first departure condition C_D1 is eventually satisfied to start the automatic steering control, thereby avoiding the lane departure of the own vehicle 100. This can reduce the possibility that the driver DR feels annoyed by the warning issued by the warning control.

On the other hand, in the case where the departure avoidable condition C_DP is not satisfied, the automatic steering control is not executed even when the first departure condition C_D1 is satisfied, so that the lane departure of the own vehicle 100 is unlikely to be avoided by the automatic steering control. The lane departure suppression device 10 executes the warning control when the warning execution condition C_LDA is satisfied while the departure avoidable condition C_DP is not satisfied. Accordingly, the driver DR is prompted to perform a driving operation for avoiding the lane departure of the own vehicle 100. Therefore, even when the automatic steering control is not executed, the driver DR who has noticed the warning issued by the warning control voluntarily performs the driving operation for avoiding the lane departure of the own vehicle 100, whereby the lane departure of the own vehicle 100 can be suppressed.

The lane departure suppression device 10 may be configured to execute the warning control so that the level of the warning (warning level LV) is a level lower than a predetermined warning level LV_TH instead of avoiding execution of the warning control, when the warning execution condition C_LDA is satisfied while the departure avoidable condition C_DP is satisfied.

For example, the lane departure suppression device 10 may be configured to delay a timing of starting the warning control when the warning execution condition C_LDA is satisfied while the departure avoidable condition C_DP is satisfied, as compared with when the warning execution condition C_LDA is satisfied while the departure avoidable condition C_DP is not satisfied.

In this case, for example, the lane departure suppression device 10 is configured to start the warning control at the time when the warning execution condition C_LDA is satisfied in the case where the warning execution condition C_LDA is satisfied while the departure avoidable condition C_DP is not satisfied, but is configured to start the warning control at a time when a predetermined time (predetermined delay time T_DLY) has elapsed since the warning execution condition C_LDA is satisfied in the case where the warning execution condition C_LDA is satisfied while the departure avoidable condition C_DP is satisfied. In other words, the lane departure suppression device 10 is configured to delay a timing of starting the warning control in executing the warning control when the warning execution condition C_LDA is satisfied while the departure avoidable condition C_DP is satisfied, as compared with when the warning execution condition C_LDA is satisfied while the departure avoidable condition C_DP is not satisfied.

Accordingly, the start of the warning control is delayed, and as a result, the execution period of the warning control is shortened, so that the level of the warning issued by the warning control is lowered. Therefore, when it is likely that the lane departure of the own vehicle 100 is avoided by the automatic steering control, it is possible to reduce the possibility that the driver DR feels annoyed by the warning issued by the warning control.

Alternatively, the lane departure suppression device 10 may be configured to display the warning and output the warning sound when the warning execution condition C_LDA is satisfied while the departure avoidable condition C_DP is not satisfied, and display the warning and perform warning vibration when the warning execution condition C_LDA is satisfied while the departure avoidable condition C_DP is satisfied.

Accordingly, the warning is displayed and the warning vibration is performed when the warning execution condition C_LDA is satisfied while the departure avoidable condition C_DP is satisfied. In general, the warning level of the warning vibration is lower than that of the warning sound. When it is likely that the lane departure of the own vehicle 100 is avoided by the automatic steering control, it is possible to reduce the possibility that the driver DR feels annoyed by the warning issued by the warning control.

Further, the departure avoidable condition C_DP may include a condition that, upon acquiring the predicted vehicle position POS_P based on the lateral acceleration GY (predicted lateral acceleration GY_P), the current vehicle speed SPD_N, the current vehicle position POS_N, and the predetermined time T of the own vehicle 100 assuming that the automatic steering control is started at that time, the distance (maximum departure distance DIS_MAX) at which the own vehicle 100 at the predicted vehicle position POS_P departs from the lane definition object 200 is shorter than a predetermined distance (maximum departure distance threshold DIS_TH). In this case, for example, the lane departure suppression device 10 acquires the predicted vehicle position POS_P by calculation in accordance with the following equation 3 based on the current vehicle position POS_N, the current vehicle speed SPD_N, the predicted lateral acceleration GY_P, and the predetermined time T.

$$POS\_P = POS\_N + SPD\_N \times T + 1/2 \times GY\_P \times T2 \quad (3)$$

Accordingly, measures of avoiding execution of the warning control or executing the warning control with a lowered level of the warning are taken only in the case where the maximum departure distance DIS_MAX is shorter than the maximum departure distance threshold DIS_TH when the warning execution condition C_LDA is satisfied.

It is generally desirable to issue the warning to prompt the driver DR to perform a departure avoidance operation if the own vehicle 100 greatly exceeds the lane definition object 200. However, if the own vehicle 100 does not exceed the lane definition object 200 to a large extent, there is little need to prompt the driver DR to perform a departure avoidance operation by issuing the warning. That is, when the maximum departure distance DIS_MAX is shorter than the maximum departure distance threshold DIS_TH, there is little need to prompt the driver DR to perform a departure avoidance operation by issuing the warning. By taking measures of avoiding execution of the warning control or executing the warning control with a lowered level of the warning only in the case where the maximum departure distance DIS_MAX is shorter than the maximum departure distance threshold DIS_TH when the warning execution condition C_LDA is satisfied, it is possible to reduce the possibility that the driver DR feels annoyed by the warning issued by the warning control.

Further, the departure avoidable condition C_DP may include a condition that the driver DR is in a state capable of performing a driving operation on the own vehicle 100. Here, the fact that the driver DR is in a state capable of performing a driving operation on the own vehicle 100 is a state in which the driver DR grips the portion of the steering wheel 35 appropriate for the driving operation with both hands, the driver DR faces the steering wheel 35, and the eyes of the driver DR are open (that is, the driver DR is awake).

Accordingly, since the departure avoidable condition C_DP includes a condition that the driver DR is in a state capable of performing a driving operation, the above-described measures of avoiding the execution of the warning control even when the warning execution condition C_LDA is satisfied or executing the warning control with a lowered level of the warning when the warning execution condition C_LDA is satisfied are taken only in the case where the driver DR is in a state capable of performing a driving operation at the time when the own vehicle 100 is about to depart from the lane LN. Since it can be highly expected that the driver DR will perform the departure avoidance operation even when the warning control is not executed or the warning control is executed with a lowered level of the warning, it is possible to secure the possibility of avoiding the lane departure of the own vehicle 100.

Figure 6:
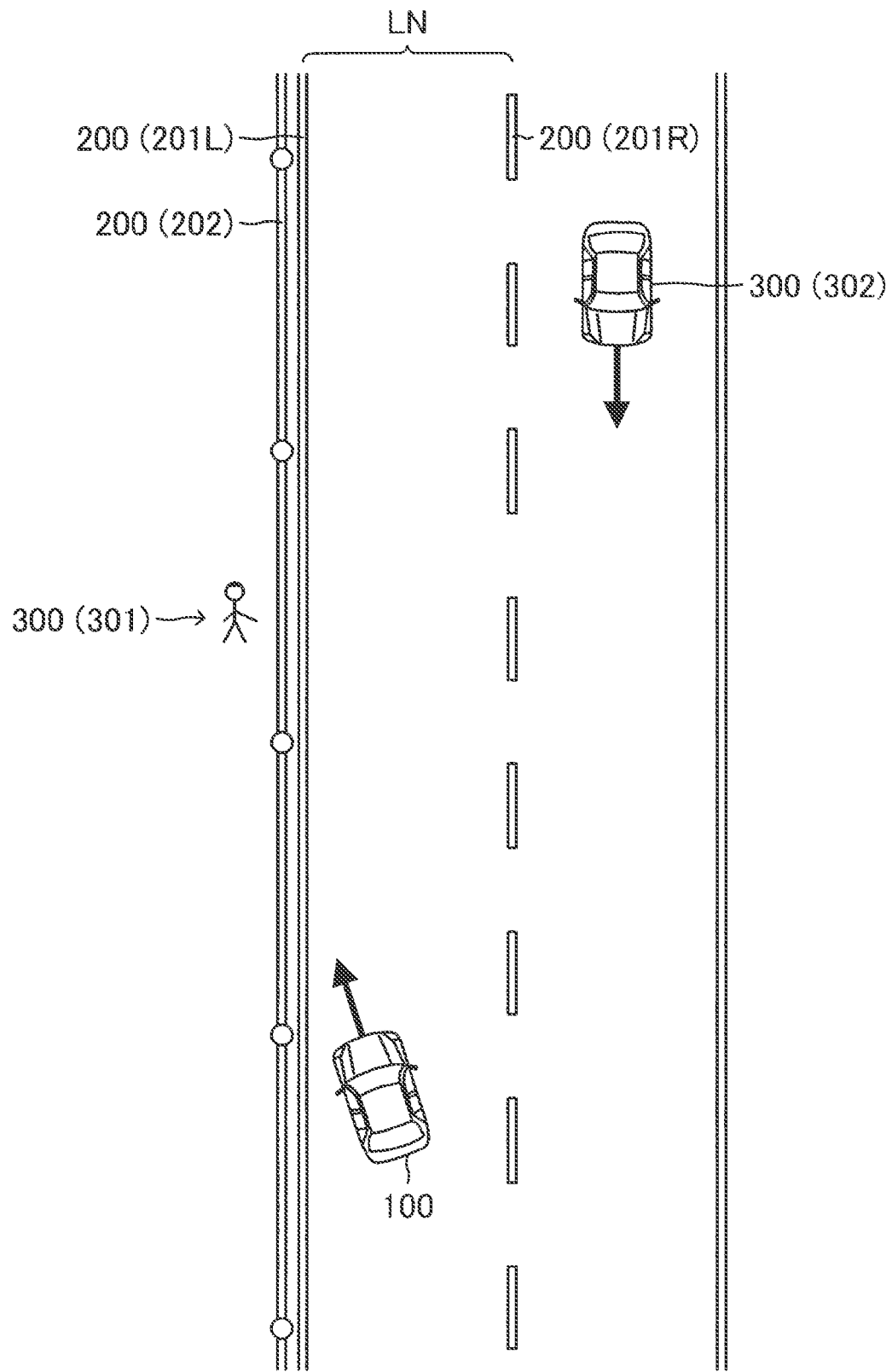
FIG. 6 is a diagram showing a road in which a guardrail is installed on the left side of the lane.

Further, the departure avoidable condition C_DP may include a condition that the lane definition object 200 is not a three-dimensional structure 202. Here, the three-dimensional structure 202 is, for example, a guardrail as shown in FIG. 6. The lane departure suppression device 10 can detect the three-dimensional structure 202 based on the peripheral detection information INF_D.

Accordingly, since the departure avoidable condition C_DP includes a condition that the lane definition object 200 is not the three-dimensional structure 202, the above-described measures of avoiding the execution of the warning control even when the warning execution condition C_LDA is satisfied or executing the warning control with a lowered level of the warning when the warning execution condition C_LDA is satisfied are taken only in the case where the lane definition object 200 is not the three-dimensional structure 202 at the time when the own vehicle 100 is about to depart from the lane LN. Thus, it is possible to ensure the traveling safety of the own vehicle 100 even when the warning control is not executed or the warning control is executed with a lowered level of the warning.

Further, the departure avoidable condition C_DP may include a condition that there is no object 300, with which the own vehicle 100 may come into contact, outside the lane definition object 200. Here, the object 300 is a pedestrian 301, another vehicle 302, or the like, as shown in FIG. 2. The lane departure suppression device 10 can detect the object 300 based on the peripheral detection information INF_D. When the object 300 is detected, and for example, when the object 300 is within a predetermined range ahead of the own vehicle 100 in the traveling direction, the lane departure suppression device 10 determines that there is the object 300, with which the own vehicle 100 may come into contact, outside the lane definition object 200.

Accordingly, since the departure avoidable condition C_DP includes a condition that there is no object 300, with which the own vehicle 100 may come into contact, outside the lane definition object 200, the above-described measures of avoiding the execution of the warning control even when the warning execution condition C_LDA is satisfied or executing the warning control with a lowered level of the warning when the warning execution condition C_LDA is satisfied are taken only in the case where there is no object 300, with which the own vehicle 100 may come into contact, outside the lane definition object 200 at the time when the own vehicle 100 is about to depart from the lane LN. Thus, it is possible to ensure the traveling safety of the own vehicle 100 even when the warning control is not executed or the warning control is executed with a lowered level of the warning.

Specific Operation of Lane Departure Suppression Device

Figure 7:
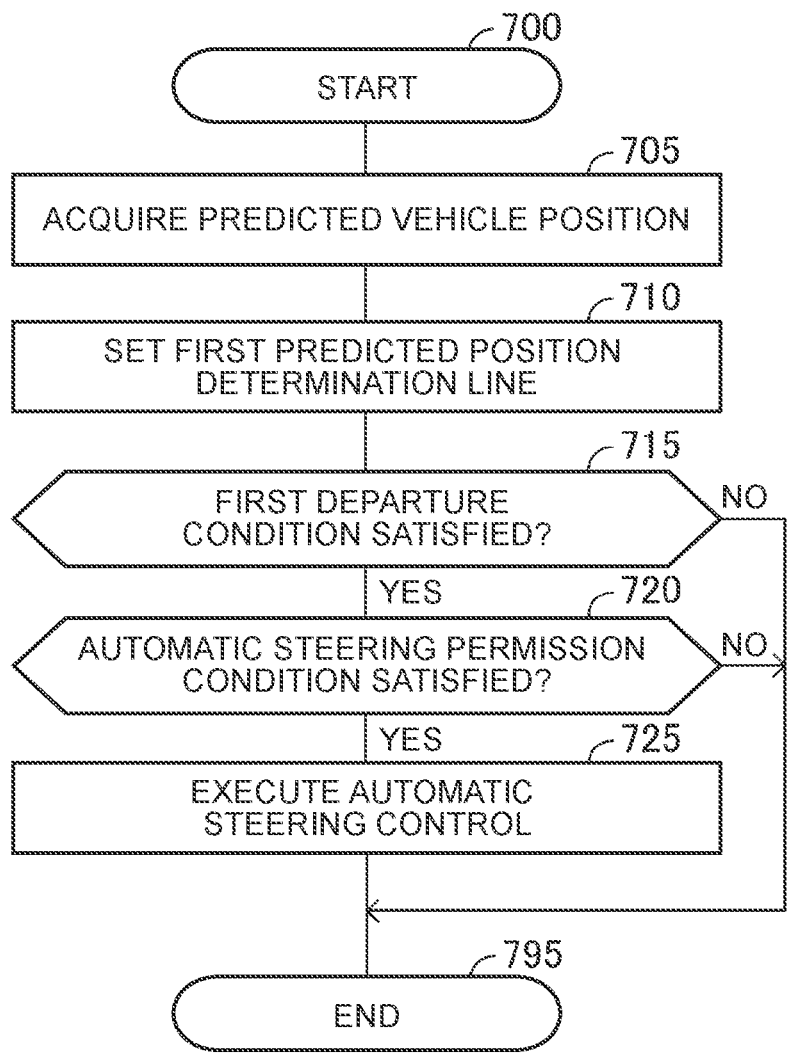
FIG. 7 is a flowchart showing a routine executed by the lane departure suppression device according to the embodiment of the present disclosure.

Next, the specific operation of the lane departure suppression device 10 will be described. The CPU of the ECU 90 of the lane departure suppression device 10 executes the routine shown in FIG. 7 at a predetermined calculation cycle. Accordingly, at a predetermined timing, the CPU starts the process from step 700 of the routine shown in FIG. 7, and advances the process to step 705 to acquire the predicted vehicle position POS_P. Next, the CPU advances the process to step 710 to set the first predicted position determination line LIN1_P. Subsequently, the CPU advances the process to step 715 to determine whether the first departure condition C_D1 is satisfied.

When the CPU determines "Yes" in step 715, the CPU advances the process to step 720 to determine whether the automatic steering permission condition C_AS is satisfied.

When the CPU determines "Yes" in step 720, the CPU advances the process to step 725 to execute the automatic steering control. Next, the CPU advances the process to step 795 to temporarily end this routine.

On the other hand, when the CPU determines "No" in step 715 or step 720, the CPU directly advances the process to step 795 to temporarily end this routine.

Figure 8:
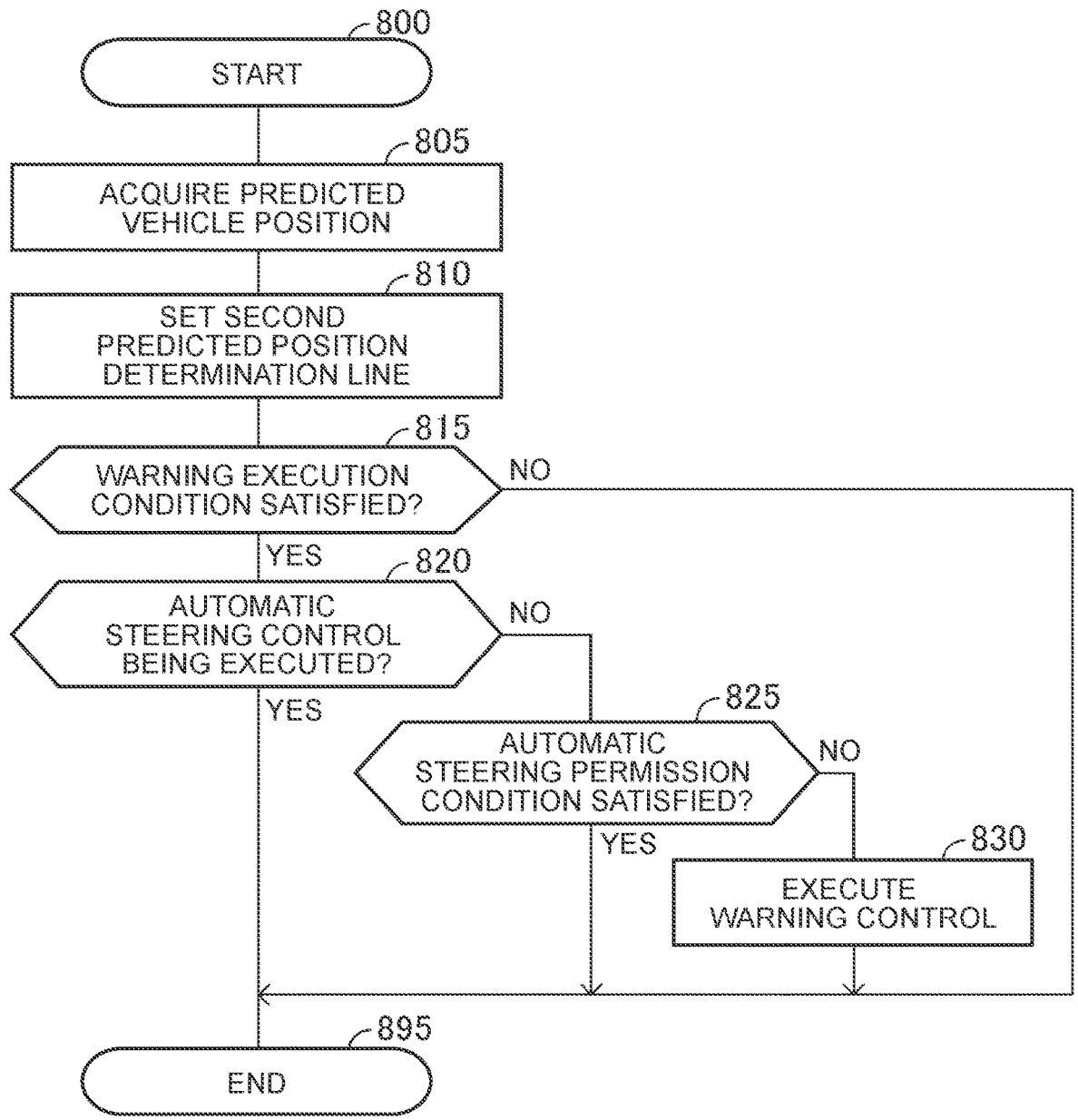
FIG. 8 is a flowchart showing a routine executed by the lane departure suppression device according to the embodiment of the present disclosure.

The CPU further executes the routine shown in FIG. 8 at a predetermined calculation cycle. Accordingly, at a predetermined timing, the CPU starts the process from step 800 of the routine shown in FIG. 8, and advances the process to step 805 to acquire the predicted vehicle position POS_P. Next, the CPU advances the process to step 810 to set the second predicted position determination line LIN2_P. Subsequently, the CPU advances the process to step 815 to determine whether the warning execution condition C_LDA is satisfied.

When the CPU determines "Yes" in step 815, the CPU advances the process to step 820 to determine whether the automatic steering control is being executed.

When the CPU determines "Yes" in step 820, the CPU directly advances the process to step 895 to temporarily end this routine. In this case, the warning control is not executed.

On the other hand, when the CPU determines "No" in step 820, the CPU advances the process to step 825 to determine whether the automatic steering permission condition C_AS is satisfied.

When the CPU determines "Yes" in step 825, the CPU directly advances the process to step 895 to temporarily end this routine. In this case, the warning control is not executed.

On the other hand, when the CPU determines "No" in step 825, the CPU advances the process to step 830 to execute the warning control. Next, the CPU advances the process to step 895 to temporarily end this routine.

When the CPU determines "No" in step 815, the CPU directly advances the process to step 895 to temporarily end this routine.

Figure 9:
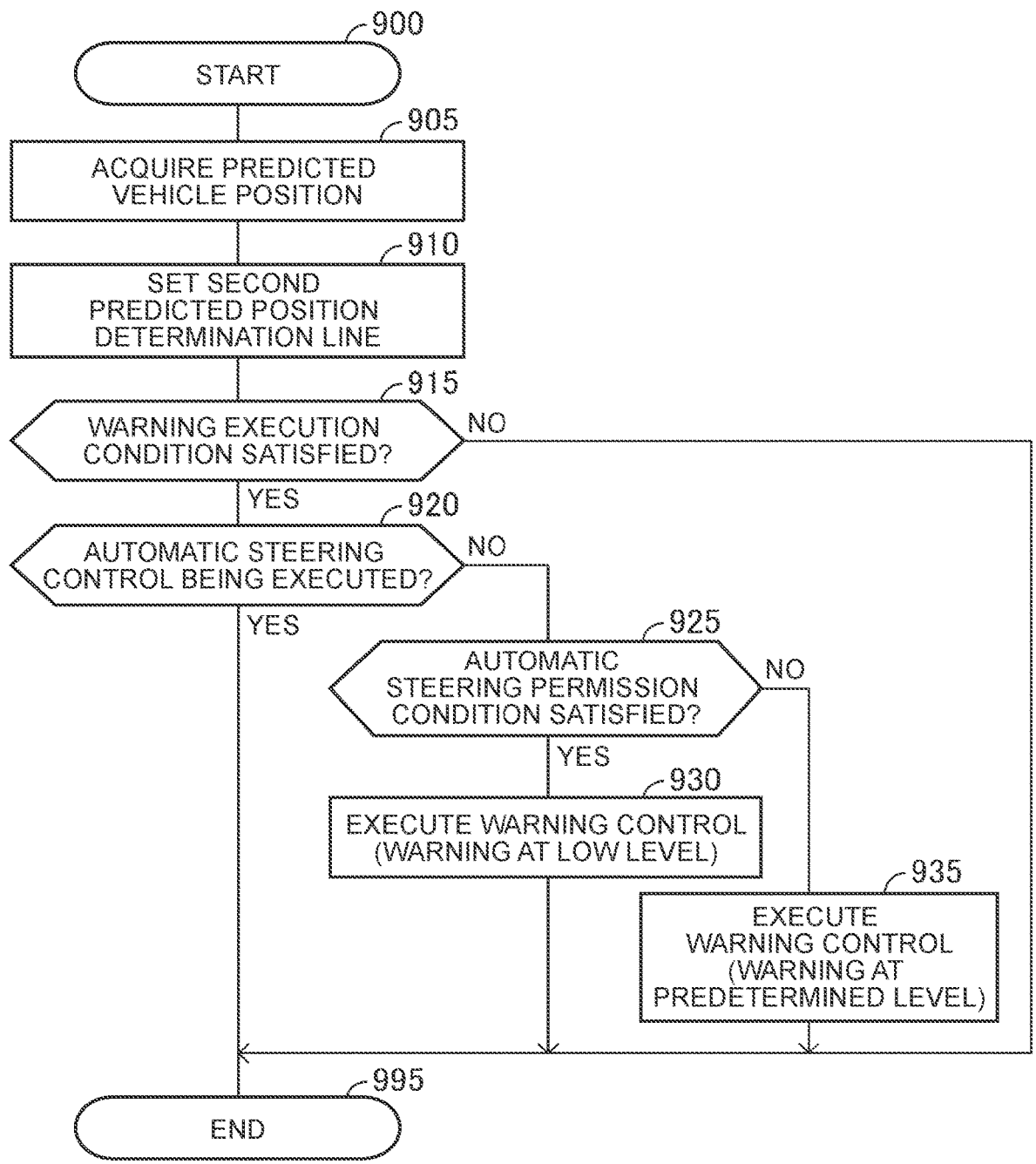
FIG. 9 is a flowchart showing a routine executed by the lane departure suppression device according to the embodiment of the present disclosure.

Alternatively, the CPU may be configured to execute the routine shown in FIG. 9 instead of the routine shown in FIG. 8. In this case, at a predetermined timing, the CPU starts the process from step 900 of the routine shown in FIG. 9, and advances the process to step 905 to acquire the predicted vehicle position POS_P. Next, the CPU advances the process to step 910 to set the second predicted position determination line LIN2_P. Subsequently, the CPU advances the process to step 915 to determine whether the warning execution condition C_LDA is satisfied.

When the CPU determines "Yes" in step 915, the CPU advances the process to step 920 to determine whether the automatic steering control is being executed.

When the CPU determines "Yes" in step 920, the CPU directly advances the process to step 995 to temporarily end this routine. In this case, the warning control is not executed.

On the other hand, when the CPU determines "No" in step 920, the CPU advances the process to step 925 to determine whether the automatic steering permission condition C_AS is satisfied.

When the CPU determines "Yes" in step 925, the CPU advances the process to step 930 to execute the warning control in which the warning level LV is set to a level lower than the predetermined warning level LV_TH. Next, the CPU directly advances the process to step 995 to temporarily end this routine. In this case, the warning control at the predetermined warning level LV_TH is not executed.

On the other hand, when the CPU determines "No" in step 925, the CPU advances the process to step 935 to execute the warning control in which the warning level LV is set to the predetermined warning level LV_TH. Next, the CPU advances the process to step 995 to temporarily end this routine.

When the CPU determines "No" in step 915, the CPU directly advances the process to step 995 to temporarily end this routine.

This concludes the description of the specific operation of the lane departure suppression device 10.

The present disclosure is not limited to the above embodiment, and various modifications can be adopted within the scope of the present disclosure.

What is claimed is:

1. A lane departure suppression device comprising a control device that executes warning control and automatic steering control, the warning control being control that issues a warning to notify a driver of an own vehicle that there is a possibility that the own vehicle departs from a lane, and the automatic steering control being control that performs automatic steering by automatically applying a steering force to the own vehicle having the possibility to depart from the lane and by returning the own vehicle to the lane, wherein the control device is configured to execute the automatic steering control when a lane departure condition is satisfied while an automatic steering permission condition is satisfied, execute the warning control such that a level of the warning is a predetermined warning level when a departure avoidable condition is not satisfied, the departure avoidable condition being satisfied when the automatic steering permission condition is satisfied, in a case where the automatic steering control is not being executed when a warning execution condition is satisfied, and not execute the warning control or execute the warning control such that the level of the warning is a level lower than the predetermined warning level when the departure avoidable condition is satisfied, in the case where the automatic steering control is not being executed when the warning execution condition is satisfied.

2. The lane departure suppression device according to claim 1, wherein the departure avoidable condition includes a condition that the driver of the own vehicle is in a state able to perform a driving operation on the own vehicle.

3. The lane departure suppression device according to claim 1, wherein the departure avoidable condition includes a condition that a definition object that defines the lane is not a three-dimensional structure.

4. The lane departure suppression device according to claim 1, wherein the departure avoidable condition includes a condition that there is no object outside a definition object that defines the lane, the object being an object having a possibility to be contacted by the own vehicle.

5. The lane departure suppression device according to claim 1, wherein the control device is configured to delay a timing of starting the warning control in executing the warning control when the warning execution condition is satisfied while the departure avoidable condition is satisfied, as compared with when the warning execution condition is satisfied while the departure avoidable condition is not satisfied.

* * * * *